3,851,081
PREPARATION OF A PUFFED SNACK FOOD
Edward Epstein, Arlington Heights, Ill., assignor to Beatrice Foods, Chicago, Ill.
No Drawing. Filed Sept. 13, 1972, Ser. No. 288,669
Int. Cl. A21d 2/34, 2/36
U.S. Cl. 426—343                                    7 Claims

ABSTRACT OF THE DISCLOSURE

Puffed foods of lower densities and greater tenderness are provided by puffing foods, such as cereal snack foods, with a moisture containing protein gel.

---

The present invention relates to a method for puffing food products, to a puffing agent for food products and to food products puffed therewith.

In the food arts constant efforts have been made toward improving the ability to expand or glow food materials into consumer products such as puffed snack foods and the like. This continued effort has been due to difficulties in finding methods for expanding foods in such a manner that the resulting puffed food is attractive and has an acceptable texture. In almost all expanded foods, the puffing is accomplished by the vaporization of water contained in the food composition during either the forming step, such as extruding, or at the cooking step. Simply mixing water in a food composition, such as cornmeal, usually results in the expanded food having a higher density than that which is desired for many applications and a rather coarse texture. For many applications, it is advantageous to provide puffed foods with a lower density and finer texture in order to provide tenderness and lightness to the puffed food, which is, of course, attractive to the consuming public.

The art has attempted to increase the amount of puffing and, hence, decrease the density and increase the tenderness of puffed foods by adding a puffing aid such as starch and leavening agents to the composition. However, these puffing aids have not been entirely satisfactory, since, generally, the puffed food still exhibits density greater than desired and a serious coarseness still results.

Accordingly, it is an object of the present invention to provide a puffing agent for use with food materials which will allow greater puffing of the food, and, hence lower densities and more tenderness of the puffed food. It is another object to provide processes for producing puffed foods, as well as providing puffed foods of lower densities and greater tenderness. Other objects will be apparent from the following disclosure and claims.

Briefly stated, the basis of the present invention is the discovery that certain protein gels in divided form may be dispersed in a food composition for subsequent increased puffing. Although the gel is in a solid, relatively dry and non-sticky form it contains sufficient water bound therein that during the heating step of a forming or cooking operation, moisture from the gel is uniformly liberated and promotes efficient puffing, lower densities and greater tenderness of the puffed food. Also, as can be easily appreciated, the addition of a protein gel substantially upgrades the nutritional value of the resulting puffed food.

While protein has been added to foods in the past to, among other things, upgrade the nutritional value of the food, these additions have always depressed the expansion properties of the food rather than increase them and, accordingly, have been unacceptable for puffing composition. Thus, as a commercial operation, proteins have not been successfully incorporated into puffed foods.

However, efforts have been made in the art to use protein materials in puffed snack foods and these efforts may be illustrated by the process of British Pat. 1,262,510, which disclosure is incorporated herein by reference. In this noteable attempt at using protein in a puffed snack food, a moist crumbly mix of isoelectric casein and water (with or without other ingredients such as wheat flour and corn starch) is prepared and subjected to mechanical pressure and extrusion. The pre-shape so obtained is then heated to a water-boiling temperature to cause puffing. While this process is indeed capable of using protein in snack foods, it still suffers from the prior disadvantages in that the texture and mouth feel are adversely affected by the protein content, although the product is better than that obtained by simply incorporating a "raw" protein into the snack food. Additionally, when other ingredients are used such as corn starch, as opposed to the protein alone, the amount of other ingredients is limited to that which will still allow the extruded mass of pre-shape to have the glassy translucent appearance, i.e., the protein must be present in substantially major amounts. Thus, such relatively large amounts of protein considerably alters the taste of snack food.

The present invention departs from these prior art practices in that the protein utilized is a "protein gel" which contains specific amounts of bound water, as hereinafter more fully defined. For purposes of the present specification, a "protein gel" is defined as a coagulated collodial system having a three-dimensional network of protein structure and the interstices of the structure having water dispersed therein. It should also be noted that the softening or melting point of the protein gel is inversely proportional to its moisture content. Of course, the precise melting point of a gel will also depend on the particular protein used to form the gel. For purposes of the present invention, however, the gel should have a melting temperature between about 250° F. and 550° F.

The protein gel may be made from any animal or vegetable protein which is capable of absorbing and retaining additional water and thereby forming a gel of the present nature. For example, animal protein such as conventional gelatin, or vegetable protein, such as acid soy protein, or milk protein, such as acid casein or sodium caseinate, may be used. Also, egg protein, such as lacto albumen, may be used.

It is critical to the invention that the protein be in the form of a gel, as described above. If the protein intended for use is not in a gel form, it must be placed in the gel form before use with the present invention. The protein may be placed in the gel state by absorbing water into colloidal protein. Thus, a dilute solution of colloidal dispersion of the protein is dried to the correct moisture content or water in intimate contact with the protein may be mechanically worked and absorbed into the protein. In any case, after the water is absorbed by the protein, the mixture must be allowed to dry at a rate sufficiently slow as to allow time for the proteins molecules and colloidal particles to be arranged in a gel structure. Thus, rapid drying methods cannot be used to make the gel of the present invention, e.g., spray drying and the like. Gel formation can be determined since the dried gel composition will be brittle and vitreous or glass-like in appearance and somewhat translucent, e.g., will have an appearance resembling a translucent plastic solid.

The temperature of gel formations is not critical so long as it is consistent with preventing denaturing of the protein and allowing the water to be in the liquid state. However, temperatures between about 45° F. and 150° F., especially between about 60° F. and 120° F., are preferred. Any convenient mixing and drying apparatus may be used as long as the drying time and temperature are consistent with allowing sufficient opportunity for the protein to form a gel structure, as noted above.

The extent of drying must be controlled so that the resulting protein gel has a moisture content of at least 5% by weight and up to 20% by weight, but preferably between 7% and 15% and especially between about 9% and 12% by weight. These amounts of water in the gel will provide the above described properties of the gel and also allow proper puffing of the food.

While the present protein gel can be used for puffing any food, it is particularly useful in puffing snack foods and the like made from a grain or cereal such as wheat, oats, barley, rye or corn. A convenient material is simply cornmeal, since this is the carbohydrate normally used in the industry for producing snack foods. Accordingly, for sake of simplicity, the invention will be illustrated in connection with cornmeal, although any food can be puffed, especially any grain or cereal snack food.

The protein gel is ground to a powder by any conventional means, such as a rod mill, to an average particle size equivalent to approximately a 16 U.S. screen sieve or smaller, e.g., equivalent to a 25 or even a 60 U.S. screen sieve. The gel and the cornmeal are mixed to form a uniform mixture. The amount of protein gel which can be added to the cornmeal (or other grain or cereal) can be from as little as 1% by weight up to any content desired. In fact, the protein gel itself can be puffed, but this would normally be too expensive for a snack food. Of course, the amount of protein gel and the amount of bound water in the gel will have a direct effect on the amount of moisture liberated during a subsequent heating step and, consequently, the amount of puffing performed. Of course, when additional water is used to make a dough or the like of a grain or cereal for shaping and cooking purposes, the water used in forming the dough will contribute to the puffing, although that water will be far less efficient in puffing than the water of the protein gel. Nevertheless, generally, on a weight basis, the protein gel will be contained in the composition to be puffed in amounts of between 3% and 30%, preferably up to 20% such as between 5% and 15%, e.g., between 9% and 12%.

If desired, although not required, water may be added to the cornmeal and protein gel to form a dough, e.g., between 10% and 17% of water based on the total weight of the mixture of cornmeal, protein gel and water.

The cornmeal mixture may also be shaped in any desired manner. Thus, the shaping may be by conventional food molding, extruding, etc. However, if the shaping step does not raise the temperature of the cornmeal mixture sufficiently high to cook the cornmeal and puff the cooked product, then a subsequently cooking and puffing step will be required, as is well known in the art. For these reasons, it is preferred to extrude the cornmeal mixture at elevated temperatures wherein the cornmeal is shaped, cooked, or at least partially cooked, and puffed in the single extrusion step. Thus, as a preferred embodiment, the cornmeal mixture is extruded in the convenventional extruder such as an Adams food grade extruder with a barrel temperature of at least 250° F. and up to 500° F. and with a die temperature of at least 275° F. and up to 450° F. Preferably, the mixture should not dwell in the extruder for an extended length of time and should be masticated, extruded and cooled within no greater than about 1 minute, preferably within less than 30 seconds, more preferably within less than 15 seconds. The extrudate is then cooled by ambient air, or if desired, a blast of air may be used and the extrudate is then chopped with rotating knives to form the desired length of collette. The collete, as extruded, may have more moisture than desired, e.g., up to about 5 to 7% moisture, and if so, the collette may be dried in an oven or the like to a moisture content of about 2% or less. The collette is then flavored with any desired flavor such as a cheese flavor and the like by conventional methods such as tumbling, dusting, oil slurry, and so forth. The collette is then ready for packaging and consumption.

The invention will be illustrated by the following examples, but the invention is not limited thereto and is fully applicable to the foregoing disclosure.

EXAMPLE 1

Production of A Gel

Casein is dispersed in water to form a suspension of about 75% by weight. The suspension is slowly stirred with heating at about 150° F. until a gel is formed. The gel is passed through a conventional food grinder to further incorporate water into the gel, and then broken in small pieces and slowly dried at temperatures not in excess of 150° F. until a moisture content of about 10% by weight is reached. The dried brittle protein gel is then ground in a rod mill until the average particle size corresponds to about a 25 U.S. screen sieve.

EXAMPLE 2

Production of Snack Food

Ground Casein gel of about 10% by weight moisture is added to cornmeal to produce a dry mixture having 20% by weight of the protein gel. Water is added to the mixture until the total mixture contains about 11 to 15% moisture including that in this protein gel. A dough is produced by mixing and extroded in an Adams extruder with a barrel and die temperature of about 320° F. The emerging collettes are cut in 1 inch lengths and dried to a moisture content of 2% by weight. The collettes are flavored with an oil surry of cheese solids by tumbling. The collettes had a density of about 2.4–2.8 pounds per cubic foot and were of exceptional tenderness. This procedure was repeated with differing amounts of casein gel and the corresponding bulk density is shown in the following table.

| Percent by Weight of Casein Gel: | Bulk Density lbs./ft. |
|---|---|
| 0 | 5.4 |
| 1 | 4.4 |
| 2 | 3.9 |
| 5 | 3.6 |
| 10 | 3.3 |
| 20 | 2.4–2.8 |
| 30 | 1.9 |

From the foregoing it will be appreciated that while the invention is illustrated in terms of puffing a food stuff, the invention is equally applicable to puffing other materials such as plastics, e.g. polyethylene, polyvinyl chloride, polystyrene, latex rubbers, etc. Of course, the mass can be shaped either prior to or during puffing as is conventionally accomplished in extruders, injection molding machines, slush molds, etc. For most shaping operations during puffing a relatively fast puffing rate is desired and the mass with the gel therein should be heated to a fairly high elevated temperature, at least 230° F. and preferably above the melting point of the gel or at least above 250° F. Temperatures up to 550° F. may, however, be used.

What is claimed is:

1. A method for puffing an expandable mass of foodstuff comprising dispersing in the mass between 3% and 20% by weight of a solid, relatively dry and non-sticky protein gel in divided form and said gel having a melting point of between 250° F. and 550° F. and containing from 5% to 15% by weight of moisture, and subjecting the mixture to an elevated temperature of at least 250° F. for a time sufficient to puff the foodstuff.

2. The method of claim 1 wherein the gel has a moisture content of between 7% and 15% by weight.

3. The method of claim 2 wherein the moisture content is between 9% and 12%.

4. The method of claim 1 wherein the gel is in a divided form having an average particle size equivalent to a 16 U.S. screen sieve or smaller.

5. The method of claim 1 wherein the amount of gel is between 5% and 15%.

6. The method of claim 5 wherein the mixture is shaped either prior to or during expansion.

7. The method of claim 6 wherein the elevated temperature is at least 275° F.

References Cited
UNITED STATES PATENTS

| | | | |
|---|---|---|---|
| 1,924,826 | 8/1933 | Anderson | 99—82 |
| 3,689,279 | 9/1972 | Bedenk | 99—83 |

FOREIGN PATENTS

| | | | |
|---|---|---|---|
| 1,262,510 | 2/1972 | Great Britain | 99—83 |

RAYMOND N. JONES, Primary Examiner

U.S. Cl. X.R.

426—352, 446, 448, 808, 167

UNITED STATES PATENT OFFICE
CERTIFICATE OF CORRECTION

Patent No. 3,851,081          Dated November 26, 1974

Inventor(s)   Edward Epstein

It is certified that error appears in the above-identified patent and that said Letters Patent are hereby corrected as shown below:

Column 1, line 19, change "glow" to --blow--.

Column 1, line 55, after "dry", insert a comma (,);

line 56, after "form", insert a comma (,).

Column 4, line 25, change "extroded" to --extruded--.

Signed and sealed this 13th day of May 1975.

(SEAL)
Attest:

RUTH C. MASON
Attesting Officer

C. MARSHALL DANN
Commissioner of Patents
and Trademarks